Jan. 2, 1951  N. J. ASHER  2,536,341
HOSE HOLDER
Filed June 16, 1947
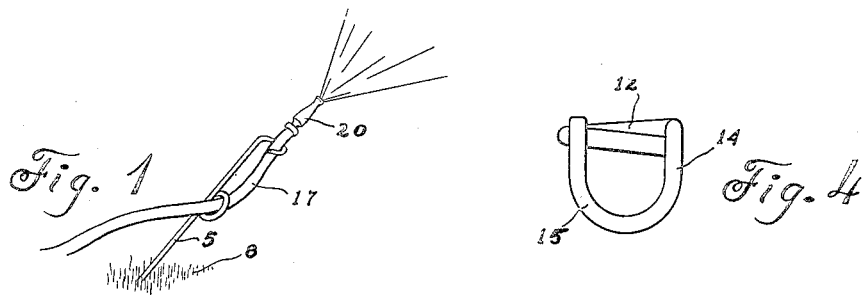
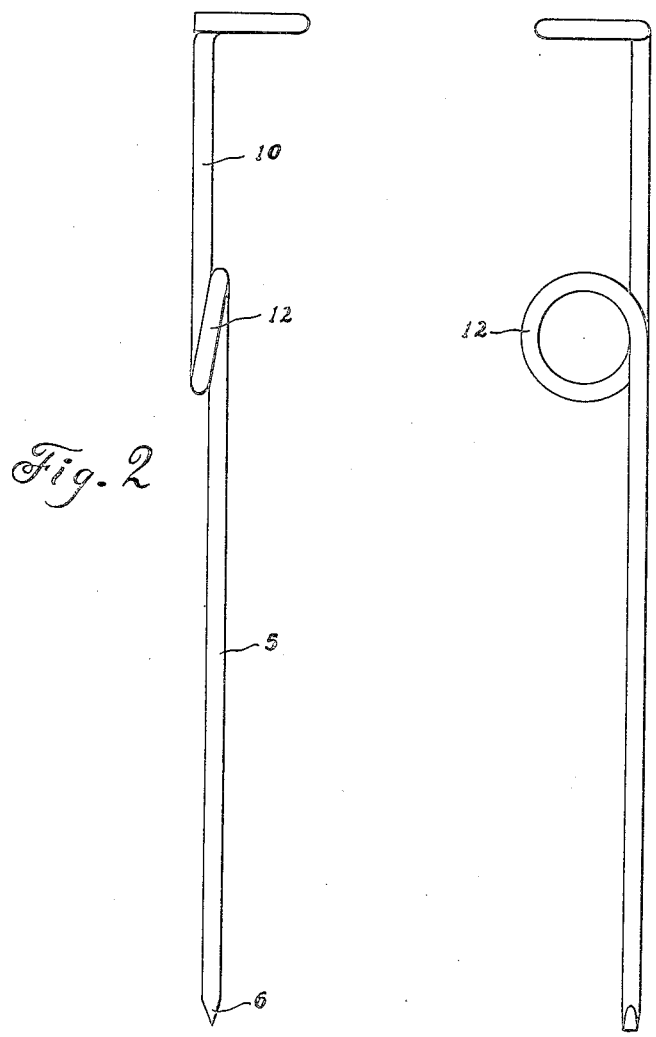
INVENTOR.
Norman J. Asher
BY
Harness, Dickey & Pierce
ATTORNEYS.

Patented Jan. 2, 1951

2,536,341

UNITED STATES PATENT OFFICE 2,536,341

HOSE HOLDER

Norman J. Asher, Detroit, Mich., assignor to
Marvin F. Umstead, Detroit, Mich.

Application June 16, 1947, Serial No. 754,947

1 Claim. (Cl. 248—87)

The present invention relates to devices for supporting garden hose, and particularly to an improved holding device adapted to support the end of a garden hose in such manner that the hose, having a sprinkler nozzle attached thereto, is adapted to serve as an effective sprinkler assembly for lawns and gardens.

Among the objects and advantages of my improved construction may be mentioned the provision of such a device which is adapted to support a hose equipped with a sprinkler nozzle at a substantial elevation above the ground and at any desired angle whereby the direction, character, and force of the spray may be varied within wide limits.

A further object is to provide such a hose-holding device which is simple and inexpensive in construction, inconspicuous when in use, light in weight and convenient to handle and use, which may be formed of a single length of relatively heavy wire or rod having a sharpened lower end adapted to be thrust into the ground at any desired angle, and the position of which may be quickly and easily changed, while the construction of the device is also such that the hose may be very quickly and easily inserted and removed from the holder.

Another object is to provide such a device which incorporates no moving parts and which does not injure a lawn even if left in one position for a considerable period of time.

Other objects and advantages will be apparent upon consideration of the present disclosure in its entirety.

In the drawing:

Fig. 1 is a perspective view of my improved hose-holding device showing a section of hose installed therein and illustrating the manner of using the invention, a sprinkler nozzle also being shown;

Fig. 2 is a side-elevational view of the device;
Fig. 3 is a front elevation of the device, and
Fig. 4 is a top-plan view.

Referring now to the drawings, wherein the construction and manner of use of my improved hose-holder are clearly illustrated, it will be seen that the holding device may be formed of a single length of relatively heavy wire or rod, which is preferably of a material such as aluminum which is not rapidly destroyed by oxidation. The lower portion of the holder consists of a straight supporting or stake section 5 having a sharpened or pointed lower extremity 6 and adapted to be thrust into the ground or turf as 8 in the manner illustrated in Fig. 1. The central portion of the rod is looped once upon itself to form an open circular loop 12. An upper continuation portion 10 extends above the loop in such manner that the upper and lower stem portions 5 and 10 are substantially straight. The interior diameter of the loop 12 is somewhat greater than the maximum diameter of the hose and nozzle portions which the device is intended to accommodate.

The upper extremity of the section 10 is bent forwardly substantially at right angles, as indicated at 14, and an integral continuation 15 of the portion 14 is contoured to define a U-shaped opening lying in a plane perpendicular to the stem assembly 5 and 10. The loop 12 and the U-portion 15 will be seen to lie upon the same side of the stem portions 5, 10. The internal diameter or width of the U may be somewhat less than that of the loop 12, since it is not necessary to pass the nozzle through it, although it need not engage the hose snugly in order to properly retain the hose in position.

It will be noted that the U portion 15, viewed from above, extends clockwise from the vertical stem portion 10, while the loop 12 is formed as a left-hand helix. By virtue of this arrangement, the upper portion of the helix lies farther forward in the direction in which the U 15 projects than does the lower portion of the loop, and when the hose 17 is thrust through the loop 12 from the rear, and then extended upwardly so that a portion of the hose near its end lies within the U 15, the bend thus imparted to the hose causes it to bind against the upper and lower portions of the loop 12 more forcibly and at a lesser angle to the ground than would be the case if the loop 12 were formed as a right-hand helix. It will be apparent upon examination of Figs. 1 and 2 that if the U were reversed, the helix should also be reversed, so that the inclination of the loop 12 with respect to the stem portion 5, 10, when viewed from the side, would still be in such direction as to cause the top of the loop to lie farther forward with respect to the direction in which the U portion projects than the bottom of the loop.

The angle at which the spray is projected from the nozzle assembly 20 may be varied not only by tilting the holder assembly to different angles but also by allowing the free end of the hose which carries the nozzle to project farther above the supporting U portion 15.

It will be apparent that various modifications and changes may be made without departure from the fair field and intended scope of the subjoined claim.

I claim:

A supporting device for garden hose comprising a relatively rigid elongated member having an integral looped section formed intermediate the length thereof, a pair of outwardly projecting stem portions extending in opposite directions from said looped section, one such stem portion forming a stake section adapted to be thrust into the ground, and a substantially U-shaped support formed integrally with the other of said stem portions and lying at a substantial angle with respect thereto, looped section and said U-shaped support project laterally and substantially in the same general direction from said stem portions, but with the looped section lying in a plane generally parallel to the stake portion and the U-shaped support lying in a plane generally perpendicular to such stake portion, the side portions of the U-shaped support being substantially parallel to the axis of the looped section.

NORMAN J. ASHER.

REFERENCES CITED

The following references are of record in the file of this patent:

UNITED STATES PATENTS

| Number | Name | Date |
| --- | --- | --- |
| 1,223,276 | Haney | Apr. 17, 1917 |
| 1,435,786 | Algeo | Nov. 14, 1922 |
| 1,537,237 | Kaestner | May 12, 1925 |